United States Patent
Siegrist et al.

[11] Patent Number: 6,105,970
[45] Date of Patent: Aug. 22, 2000

[54] SEAL ARRANGEMENT

[75] Inventors: Uwe Siegrist, Ottrau; Otmar Braun, Freilendorf, both of Germany

[73] Assignee: Firma Carl Freudenberg, Weinheim, Germany

[21] Appl. No.: 09/143,128

[22] Filed: Aug. 28, 1998

[30] Foreign Application Priority Data

Sep. 9, 1997 [DE] Germany ............................ 19739472

[51] Int. Cl.$^7$ ...................................................... F16J 15/32
[52] U.S. Cl. ........................ 277/458; 277/489; 277/491; 277/448; 277/435
[58] Field of Search .................................. 277/589, 489, 277/491, 448, 435

[56] References Cited

U.S. PATENT DOCUMENTS

| | | | |
|---|---|---|---|
| 2,893,795 | 1/1959 | Dooling | 277/448 |
| 5,092,610 | 3/1992 | Dunham et al. | 277/589 |
| 5,156,410 | 10/1992 | Hom et al. | 277/589 |
| 5,172,921 | 12/1992 | Stenlund | 277/589 |
| 5,291,974 | 3/1994 | Bianchi | 277/589 |
| 5,433,452 | 7/1995 | Edlund et al. | |

*Primary Examiner*—Anthony Knight
*Assistant Examiner*—Enoch E Peavey
*Attorney, Agent, or Firm*—Kenyon & Kenyon

[57] ABSTRACT

A sealing arrangement for establishing a seal between two machine elements, such as a rod or piston undergoing axial motion within a housing. A rod or piston seal is arranged in a groove of the second machine element, which typically is the housing of the rod or piston. The groove is open in the direction of the first machine element, and contains a seal ring and a prestress ring made of elastomeric material. The seal ring has an essentially T-shaped cross-section and touches the surface of the first machine element which is to be sealed with the sealing surface of its radial ridge, forming a seal. The prestress ring is arranged between the base of the groove and the axial ridge of the seal ring, under elastic prestress. The transition from the faces of the radial ridge to the sealing surface is rounded.

9 Claims, 2 Drawing Sheets

SEAL ARRANGEMENT

BACKGROUND OF THE INVENTION

This invention relates to a sealing arrangement of the type used for sealing off two machine elements that undergo axially reciprocal motion with respect to one another. A rod or piston seal is arranged in a groove of the second machine element. The groove is open in the direction of the first machine element, and houses a seal ring and a prestress ring made of elastomeric material. The seal ring has an essentially T-shaped cross-section and touches the surface of the first machine element that is to be sealed with the sealing surface of a radial ridge, forming a seal. The prestress ring is arranged between the base of the groove and the axial ridge of the seal ring under elastic prestress.

Such a sealing arrangement is described in German Patent No. 41 40 833 C3, FIG. 2. (The contents of corresponding U.S. Pat. No. 5,433,452 are incorporated herein by reference for their teachings of the state of the art.) In the unpressurized state, the low-pressure-side groove flank forms an acute angle with the face of the axial ridge which lies directly opposite to it, this angle being open toward the surface to be sealed. When pressure is applied and/or due to the friction between the seal ring and the surface to be sealed, the seal ring can be pivoted toward the low-pressure side in such a way that it forms a sealing edge relative to the surface to be sealed, with the seal ring delimiting a wedge gap with the surface to be sealed, which gap opens toward the low-pressure side. The transition regions from the faces of the radial ridge to the sealing surface and to the axial ridge are formed with sharp edges in each instance, where the sharp-edged transition region of the faces to the sealing surface result in a relatively high rate of abrasive wear, due to the relative back and forth mobility of the surface to be sealed relative to the seal ring. Consequently, the sealing edge can be damaged during use. In the transition region from the faces of the radial ridge to the axial ridge, high notch stresses prevail during use of the sealing arrangement, and these can lead to tearing of the ring in this region.

SUMMARY OF THE INVENTION

The present invention is an improvement over prior sealing arrangements such as that discussed above so that the durability of the seal ring, particularly in the transition region from the faces of the radial ridge to the sealing surface, is improved.

In the present invention, a sealing arrangement is provided for use between a first machine element, such as a rod or piston, that has a sealing surface, and a second machine element containing a groove that is open in the direction of the first machine element. A seal is housed within the groove, and comprises a seal ring having a centrally located radial ridge portion having side and an axially extending sealing surface, and side ridges axially extending from and defining an offset with respect to the faces of the radial ridge portion, so as to form a T-shape in cross section. An elastomeric prestress ring is located in the groove between the base of the groove and the side ridges of the seal ring under a level of elastic prestress.

In the present invention, the transition from the faces of the radial ridge to the sealing surface is structured to be rounded. An advantage of the present design is that the relative movement of the first machine element with respect to the seal ring does not result in damage to or destruction of the sealing surface. Moreover, the sealing surface always contacts the surface to be sealed over a flat area. Therefore displacement of components of the sealing surface, particularly of the two sealing edges, during the back and forth movement of the first machine element, below the sealing surface, is precluded.

The sealing arrangement according to the invention demonstrates good usage properties over a long period of use. In addition, it is advantageous that the sealing surface has a relatively small expanse in the axial direction on the inside, following the rounded part, in spite of the significant width of the radial ridge, and that therefore the break-away force between the first machine element and the seal ring, when the direction of relative movement is reversed, is only slight.

Furthermore it is advantageous that assembly of the first machine element with the seal ring can be performed in a simple and problem-free manner, even if the surface of the first machine element which is to be sealed has greater diameter tolerances. Assembly errors which could result in damage and/or destruction of the ring are thereby kept to a minimum.

The advantageous usage properties of the sealing arrangement occur if the radius of curvature of the transition between the faces and the sealing surface is at least 0.2 mm. In an ideal case, the radius is 10% of the total width. Such a radius is significantly greater than the sharp-edged transition in the sealing arrangement known from the state of the art, where such a sharp-edged transition generally has a radius of at most 0.1 mm.

Preferably, the transition from the faces of the radial ridge to the axial ridge is structured in a channel shape, where the radius of the channels is preferably at least 0.1 mm. It has proven to be advantageous that the ratio of the radius of the transition region of the faces of the radial ridge toward the sealing surface to the radius of the channels be at least 1.5. A comparably lesser radius of the channels is sufficient, in order to avoid an impermissibly high notch effect during use of the seal ring, in accordance with its intended use, in this region. The ratio of the total width of the seal ring and the width of the sealing surface in the same direction is preferably between 1.1:1 and 1.6:1.

According to another embodiment, the sealing surface can also be structured to be deeper toward the middle defining a cavity or depression, which improves the sealing effect. The cavity created by the depression can be used as a lubricant pocket so that it can be filled with an additional lubricant, for example a barrier grease, in order to reduce the break-away force and the friction to a minimum.

The depression is dependent on the total height of the seal ring, where the dimension of the depression in the radial direction is preferably between 4 and 10% of the total height of the seal ring. In this embodiment, the transition of the radius from the radial ridge to the depression is preferably structured to be rounded, resulting in two sealing beads, which result in an increase in sealing effect.

The ratio of the total height of the seal ring to the height of the radial ridge is preferably 1.25 to 1.75. Such a structure ensures that the radial ridge is sized to be sufficiently large and that therefore the resulting ring surface of the seal ring is also sufficiently large in order to shift the seal ring in the direction of the low-pressure side upon pressure impact. Furthermore it is advantageous that the pressure acts on the O-ring and that the seal ring is additionally pressed on (i.e., activated) by the O-ring. Overflow of the medium to the low-pressure side, as by so-called by-blow effects, is thereby prevented.

The prestress ring is preferably structured as an O-ring. O-rings are inexpensive and are available in many sizes, so that the rod or piston seal can be produced in simple and cost-effective manner, in terms of production technology and economics.

The profile of the support surface of the axial ridge which faces the prestress ring has a radius of curvature which is greater than the radius of curvature of the O-ring. The ratio of the radius of the profile of the support surface and the radius of the profile of the O-ring is preferably 1.5 to 2.5. With such a structure, the inherent spring elasticity of the O-ring can be utilized in a particularly good manner, which makes it possible to reduce the elastic prestress which is applied and to achieve a good sealing result with a comparably slight elastic deformation of the O-ring. Relaxation phenomena which occur are counteracted with such a structure, so that a significantly improved period of use is achieved as compared with rod or piston seals in which the O-ring rests on a support surface which is flat in the axial direction. The concave profile improves the relative mobility of the O-ring. In addition, breathing movements of the O-ring between two consecutive work cycles are made possible.

DETAILED DESCRIPTION OF THE INVENTION

Figure 1:
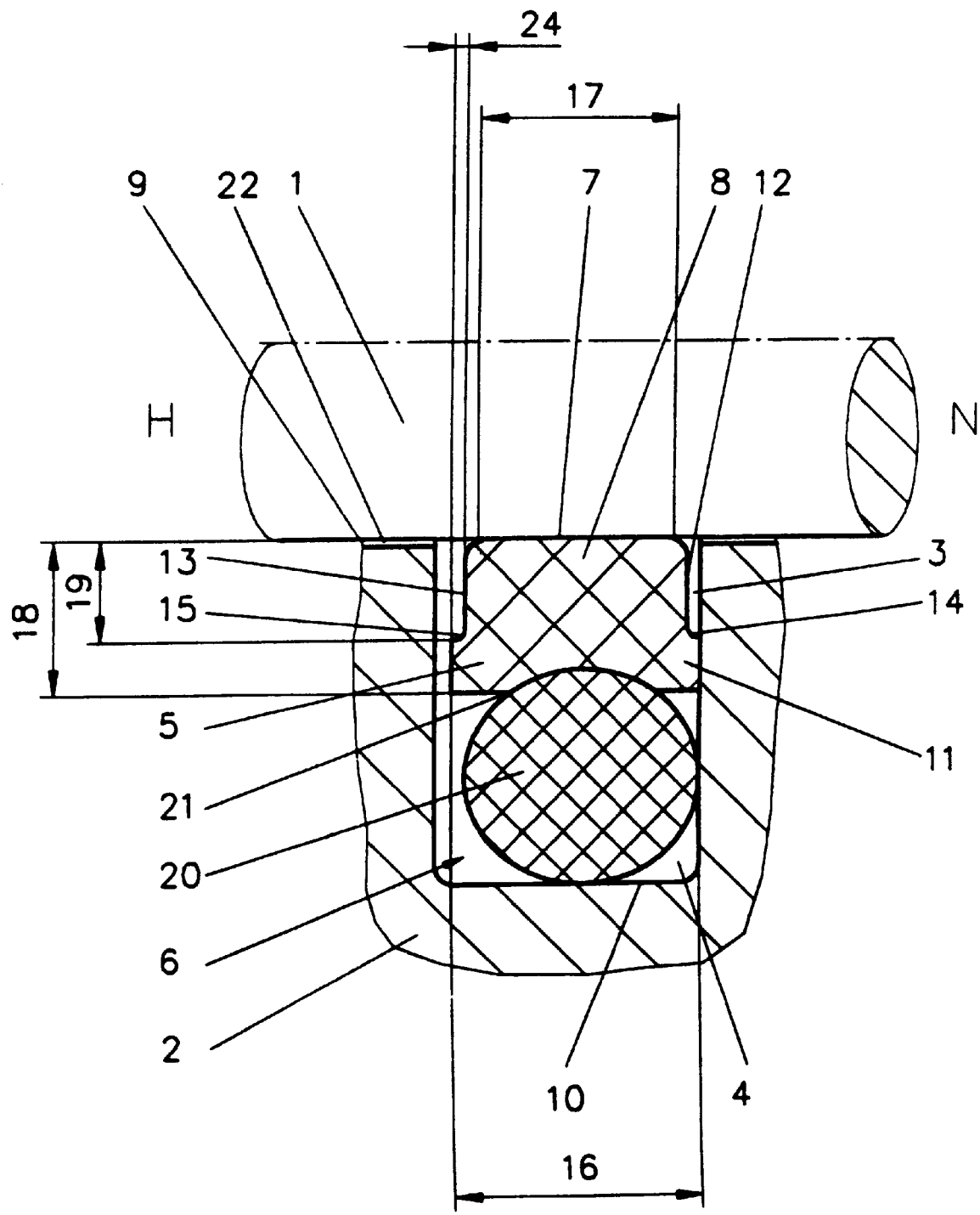
FIG. 1 is a schematic cross-sectional view of a first embodiment of a sealing arrangement constructed according to the principles of the invention.

FIG. 1 shows a sealing arrangement which comprises a rod seal 3. In the illustrated embodiment, first machine element 1 is a rod which can undergo axially reciprocal motion, and which is surrounded, at a radial distance, by a housing which forms second machine element 2. A groove 4 which is open in the direction of first machine element 1 is arranged in the second machine element 2, and the rod seal 3 is held in this groove. The axial width of groove 4 is greater than the axial expanse of the rod seal 3, so that the rod seal can be placed against the delimitation wall of groove 4 which faces the low-pressure side, depending on the direction of pressure impact. The rod seal is arranged within groove 4 with radial prestress; sealing surface 7 of seal ring 5 surrounds surface 9 of first machine element 1, which surface is sealed by a seal under a level of radial prestress.

Prestress ring 6 takes the form of an O-ring in the illustrated embodiments, and is made of elastomeric material. In the exemplary embodiment shown here, the low-pressure side is indicated with N, the high-pressure side with H. The sealing of gap 22 occurs through the establishment of seals at the bottom 10 of groove 4 and at the delimitation wall facing the low-pressure side N by O-ring 20; at the low-pressure delimitation wall by the low-pressure face of axial ridge 11; and along surface 9 of the first machine element 1 by sealing surface 7.

Seal ring 5 has a T-shaped cross-section, where the transition from faces 12 and 13 of radially extending ridge 8 to the sealing surface 7 is formed by a radius which is 0.6 mm in this exemplary embodiment and is twice as great as the radius of channels 14 and 15. Preferably, the ratio of the total width 16 of the seal ring 5 to the width of the channels 14, 15 is between 16 and 24. The ratio of the total width 16 and the width 17 of the sealing surface 7 is 1.4 to 1.6.

In this exemplary embodiment, the seal ring 5 is made of PTFE.

Axial ridge 11 is provided with a support surface 21 on the side facing O-ring 20. The ratio of the radius of the profile of support surface 21 to the radius of the profile of the O-ring is 1.5 in this exemplary embodiment.

The function of the sealing arrangement will now be further described. If the pressure conditions in the sealing arrangement shown in the illustrated embodiment change in such a way that the pressure on the side N increases above the pressure which prevails on the side H, the higher pressure is first applied at circular face 12 of the radial ridge 8. The rod seal as a whole moves to the left within groove 4, with the hydraulically effective circular surface at which the pressure is applied being increased in steps. First, a gap which extends in the radial direction is formed between axial ridge 11 and the delimitation wall of groove 4, with the elastic prestress of the O-ring 20 being gradually reduced at this delimitation wall. As the rod seal moves further to the left within groove 4, the prestress of O-ring 20 at the delimitation wall continues to decline, until it no longer touches the delimitation wall and makes contact with the delimitation surface of groove 4 which faces the low-pressure side, under axial prestress. The face of axial ridge 11 which then faces the low-pressure side also touches this delimitation surface.

When the pressure conditions are reversed again, the process described above is repeated in the opposite direction.

The extrusion of the seal ring 5 into gap 22 is reliably prevented by the T-shaped cross-section of the seal ring 5.

Figure 2:
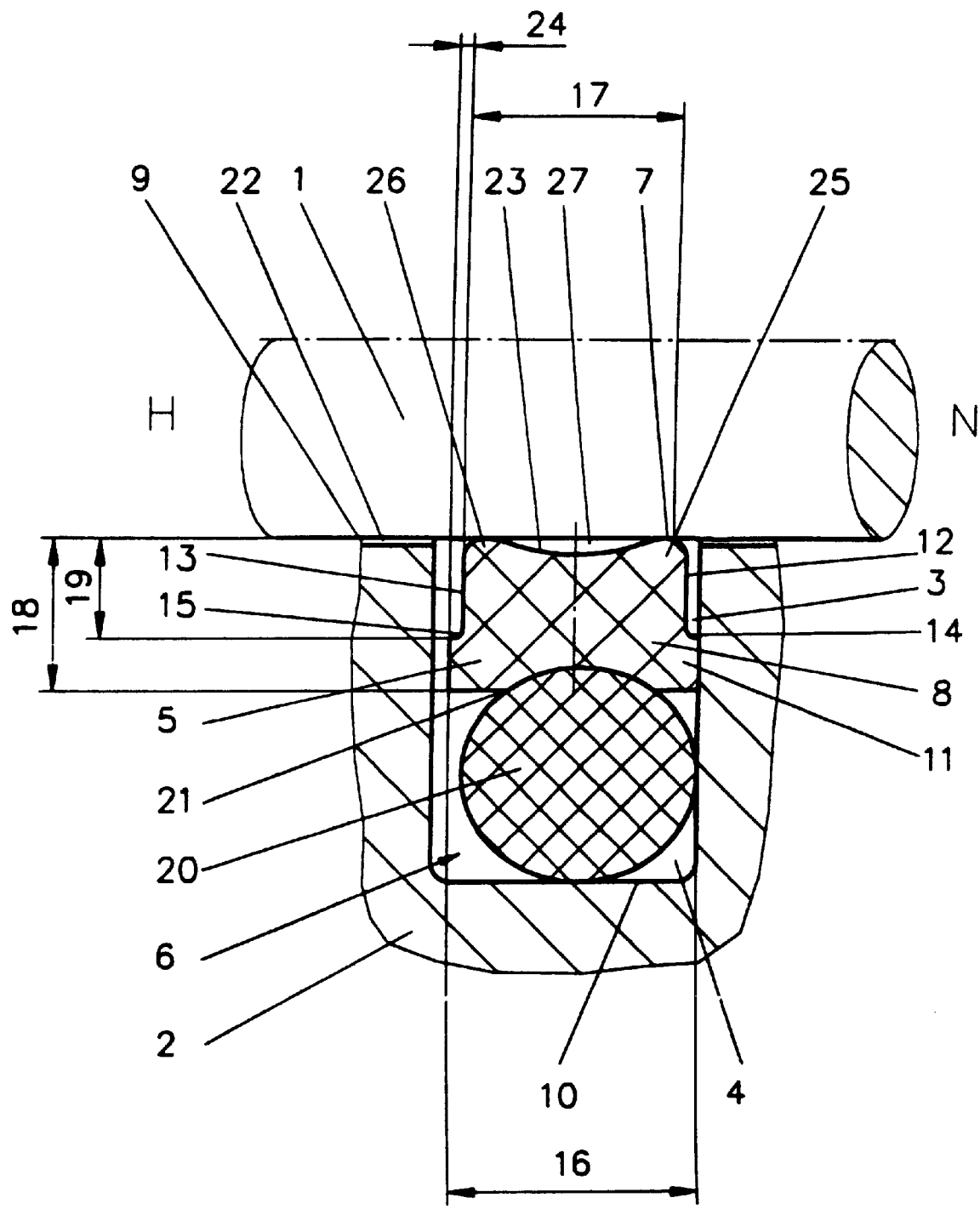
FIG. 2 is a schematic cross-sectional view of a second embodiment of a sealing arrangement constructed according to the principles of the invention.

Due to the rounded transition from faces 12 and 13 of radial ridge 8 to sealing surface 7 and due to the provision of channels 14 and 15, also with a rounded structure, the sealing arrangement of the invention has good usage properties over a very long period of use. FIG. 2 shows a second exemplary embodiment of a sealing arrangement according to the invention, which differs from the embodiment of FIG. 1 in that sealing surface 7 faces a different structure. Sealing surface 7 has a depression 23, which extends axially in the center, in the direction of O-ring 20, so that a sealing bead 25 and 26 which extend circumferentially around the first machine element 1 in each instance is formed in the region of the two face delimitations 12 and 13 of the sealing surface 7.

Sealing beads 25 and 26, which axially offset from one another, delimit a cavity 27 together along the surface 9 of the first machine element 1 (against which a seal is formed). The cavity is filled with a barrier grease in this embodiment. This results in a particularly advantageous effect on the break-away force and the friction.

In the exemplary embodiment shown here, the dimension of the depression is 8% of the diameter of O-ring 20. Both sealing beads 25, 26 make a rounded transition to depression 23.

What is claimed is:

1. A sealing arrangement for providing a seal between two machine elements that are capable of undergoing axially reciprocal motion relative to one another, comprising:

a first machine element having a sealing surface, the first machine element being a rod or piston;

a second machine element containing a groove, the groove having a base and facing side walls and being open in the direction of the first machine element; and a seal that is contained within the groove of the second machine element, the seal comprising i. a seal ring having 1) a centrally located radial ridge portion defined by axially displaced, radially extending faces connected to one another by an axially extending sealing surface for sealing against the surface of the first machine element, wherein the radially extending faces are connected to the axially extending sealing surface by a rounded transition, and 2) side ridges axially extending from and defining an offset with respect to the faces of the radial ridge portion, so as to form a T-shape in cross section ii. a prestressed O-ring made of elastomeric material, the O-ring being located in the groove between the base of the groove and the side ridges of the seal ring under a level of elastic prestress, wherein the axial ridge of the seal ring has a support surface that faces the O-ring and the support surface has a profile that has a radius of curvature which is greater than the radius of curvature of the O-ring, and wherein the radial depth of the radius of curvature of the support surface is between 8 and 12% of the radial thickness of the prestress ring.

2. The sealing arrangement according to claim 1, wherein the rounded transition has a radius of curvature that is the greater of 0.2 mm and 10% of the total width of the seal ring.

3. The sealing arrangement according to claim 1, wherein the offset of the axial ridges with respect to the faces provides a channel having a width on each side of the radial ridge.

4. The sealing arrangement according to claim 3, wherein the channels provide a rounded transition zone between the faces and the side ridges, the rounded transition having a radius of curvature that is between 0.1 mm and the width of the channels.

5. The sealing arrangement according to claim 1, wherein the ratio of the total width of the seal ring to the width of the sealing surface is between 1.4:1 and 1.6:1 in the same direction.

6. The sealing arrangement according to claim 5, wherein the ratio of the total width of the seal ring and the width of the channels is between 16:1 and 24:1.

7. The sealing arrangement according to claim 1, wherein the ratio of the total height of the seal ring to the height of the radial ridge that lies radially inwardly of the axial ridges is between 1.25:1 and 1.75:1.

8. The sealing arrangement according to claim 1, wherein the seal ring is made of polytetrafluoroethylene.

9. The sealing arrangement according to claim 1, wherein the seal ring is made of polyurethane.

* * * * *